(12) United States Patent
Patten

(10) Patent No.: US 10,381,858 B2
(45) Date of Patent: Aug. 13, 2019

(54) CHARGING OF A WIRELESS DEVICE WITH TIME-DISPLAYING POWER SOURCE SYSTEM

(71) Applicant: Jahvante Patten, Bristow, VA (US)

(72) Inventor: Jahvante Patten, Bristow, VA (US)

( * ) Notice: Subject to any disclaimer, the term of this patent is extended or adjusted under 35 U.S.C. 154(b) by 0 days.

(21) Appl. No.: 15/478,703

(22) Filed: Apr. 4, 2017

(65) Prior Publication Data

US 2018/0287412 A1  Oct. 4, 2018

(51) Int. Cl.
*H02J 7/00* (2006.01)
*H02J 7/02* (2016.01)
*H02J 50/12* (2016.01)
*G04G 9/00* (2006.01)

(52) U.S. Cl.
CPC ............ *H02J 7/025* (2013.01); *G04G 9/00* (2013.01); *H02J 50/12* (2016.02)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| | | | | |
|---|---|---|---|---|
| 6,469,472 B1* | 10/2002 | Aoshima | ............... | H02J 7/0044 320/122 |
| 2009/0254466 A1* | 10/2009 | Karkanias | ............ | G06Q 20/105 705/35 |
| 2009/0298553 A1* | 12/2009 | Ungari | ................ | H04M 1/7253 455/573 |
| 2012/0013294 A1* | 1/2012 | Yeh | .......................... | H02J 7/025 320/108 |
| 2013/0329532 A1* | 12/2013 | Sorias | .................... | G04C 10/00 368/64 |
| 2014/0375246 A1* | 12/2014 | Boysen, III | ............ | H02J 5/005 320/101 |
| 2015/0115877 A1* | 4/2015 | Arai | ...................... | H02J 7/0042 320/108 |
| 2015/0180270 A1* | 6/2015 | Takano | .................. | H01F 38/14 320/103 |
| 2015/0364938 A1* | 12/2015 | Lapetina | ............... | H01F 27/365 320/114 |
| 2016/0094076 A1* | 3/2016 | Kasar | ...................... | H02J 7/025 320/103 |
| 2016/0094079 A1* | 3/2016 | Hiroki | .................... | H02J 7/025 320/101 |
| 2016/0261136 A1* | 9/2016 | Kato | ...................... | H02J 7/0042 |
| 2016/0261139 A1* | 9/2016 | Kidakarn | ................ | H02J 7/025 |
| 2017/0047765 A1* | 2/2017 | Jung | ....................... | H02J 7/025 |
| 2017/0170678 A1* | 6/2017 | Uhm | ...................... | H02J 50/70 |

* cited by examiner

*Primary Examiner* — Arun C Williams
(74) *Attorney, Agent, or Firm* — Miles & Stockbridge P.C.

(57) ABSTRACT

According to example embodiments, charging of a wireless device includes using a time-displaying power source system to transmit electrical power to a wireless receiver by inductive electrical power transfer.

18 Claims, 9 Drawing Sheets

410

CHARGING OF A WIRELESS DEVICE WITH TIME-DISPLAYING POWER SOURCE SYSTEM

FIELD

Example embodiments are directed to charging of a wireless device with a time-displaying power source system.

BACKGROUND

Charging of a wireless device generally requires that the wireless device be connected to a charging base receiving electrical power through wire conductors connected to an electrical outlet. Thus, the wireless device is restricted to a particular area until the charging is complete or at a desired charge, limiting the mobility of a user of the wireless device.

BRIEF SUMMARY

Example embodiments are directed to charging of a wireless device with a time-displaying power source system.

Example embodiments are directed to charging of a wireless device by electrical power transmitted using inductive electrical power transfer.

BRIEF DESCRIPTION OF THE DRAWINGS

Example embodiments will be more clearly understood from the following detailed description taken in conjunction with the accompanying drawings. FIGS. 1-8 represent non-limiting, example embodiments as described herein.

FIG. 1 is a perspective view of a time-displaying power source system according to example embodiments.

FIG. 2 is a perspective view of a time-displaying device according to a first example embodiment.

FIG. 3 is a perspective view of a transmissive portion of an inductive electrical system in a time-displaying device according to example embodiments.

FIG. 5 is a cross-sectional view of a time-displaying device according a second example embodiment.

FIG. 6 is side view of a wireless receiver according to example embodiments.

FIG. 7 is a flow chart of charging of a wireless device using a time-displaying power source system according to example embodiments.

FIG. 8 is a block diagram of a system in a time-displaying device and/or a wireless receiver according to an example embodiment.

In the drawings, the thicknesses of layers and regions may be exaggerated for clarity, and like numbers refer to like elements throughout the description of the figures.

DETAILED DESCRIPTION

Figure 1:
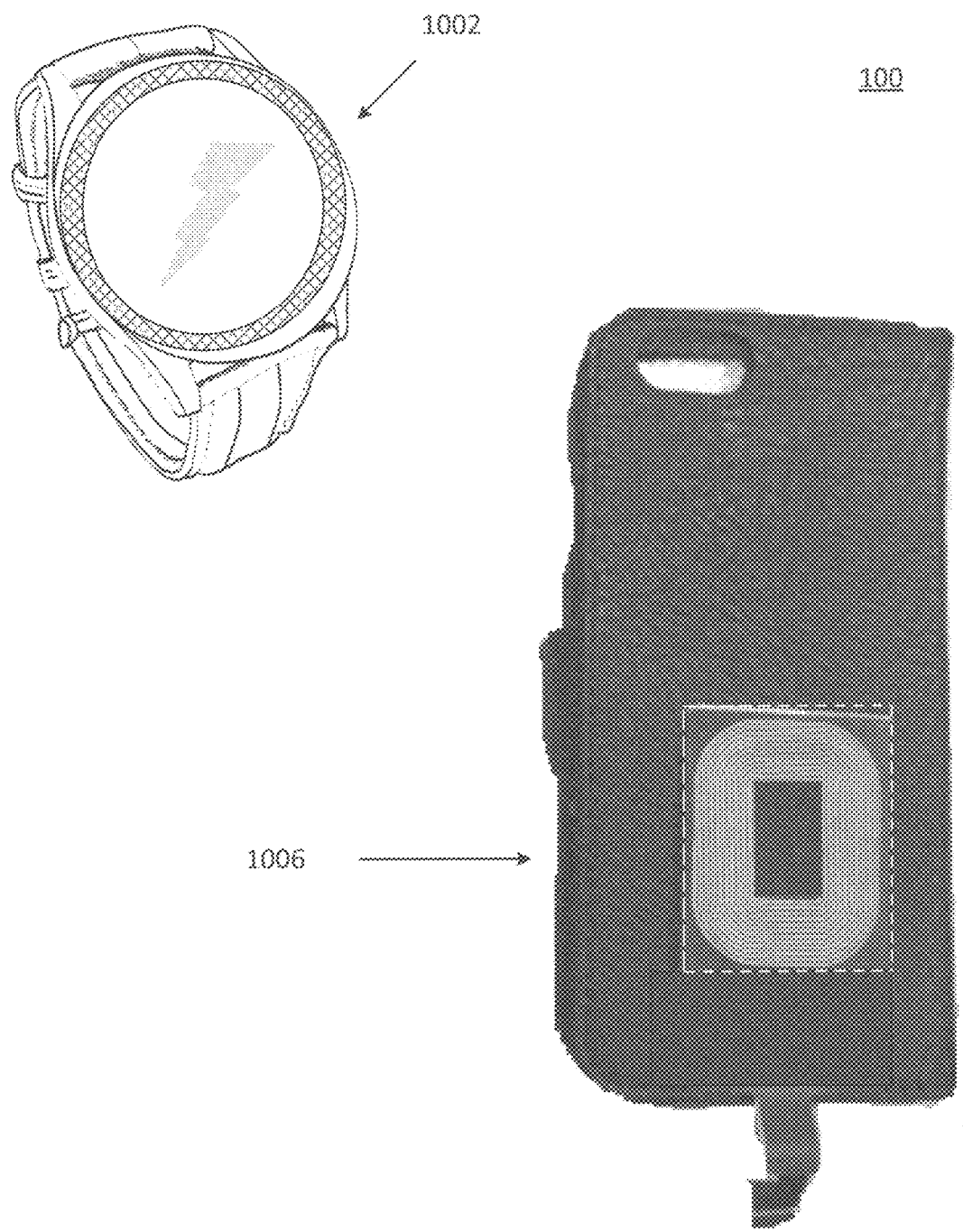

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The terminology "substantially small distance" as used within the context of this disclosure includes distances of up to about 5 cm (e.g., 2-cm, 3-cm, 4-cm or 5-cm).

The terminology "timepiece" or "watch" as used within the context of this disclosure is a device that measures or displays the progress of time without the use of a striking mechanism.

The terminology "clock" means as used within the context of this disclosure is a device that measures or displays the progress of time with the use of a striking mechanism.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Example embodiments are directed to charging of a wireless device using a time-displaying power source system.

FIG. 1 is a perspective view of a time-displaying power source system according to example embodiments.

Referring to FIG. 1, a time-displaying power source system 100 according to example embodiments includes a wireless receiver 1006 configured to receive and store electrical power (electrical energy) transmitted by inductive electrical power transfer, and a time-displaying device 1002 configured to transmit the electrical power to the wireless receiver 1006 by inductive electrical power transfer over a substantially small distance.

Inductive electrical power transfer as described herein is the transmission of electrical energy from an electrical source to a wireless receiver by an alternating electromagnetic field using inductive coupling, or resonant inductive coupling, between coils of a transmitter and coils of the wireless receiver. In particular, a change in current through the coils of the transmitter induces a voltage across the coils of the wireless receiver through electromagnetic induction.

According to example embodiments, the time-displaying power source system 100 functions as a power source for a wireless device (not shown). For example, the wireless device can be a mobile phone, a tablet, a biomedical device (such as a cardiac monitor, a temperature monitor, a blood glucose monitor, a respiratory monitor, a hemodynamic monitor, a blood pressure monitor, etc.), or a portable device (a headphone set, a camera, a music player, etc.).

The time-displaying power source system 100 is a wearable system. For instance, the wireless receiver 1006 can be a case, a holster or a belt or purse clip, by which the wireless device is held. The time-displaying device 1002 can be a wristwatch, a pocket watch, a clock or a timepiece. Thus, the time-displaying power source system 100 allows a user to charge a wireless device without being restricted to a particular area. The time-display power source system 100 also is a fashionable way of concealing a power source.

Figure 2:
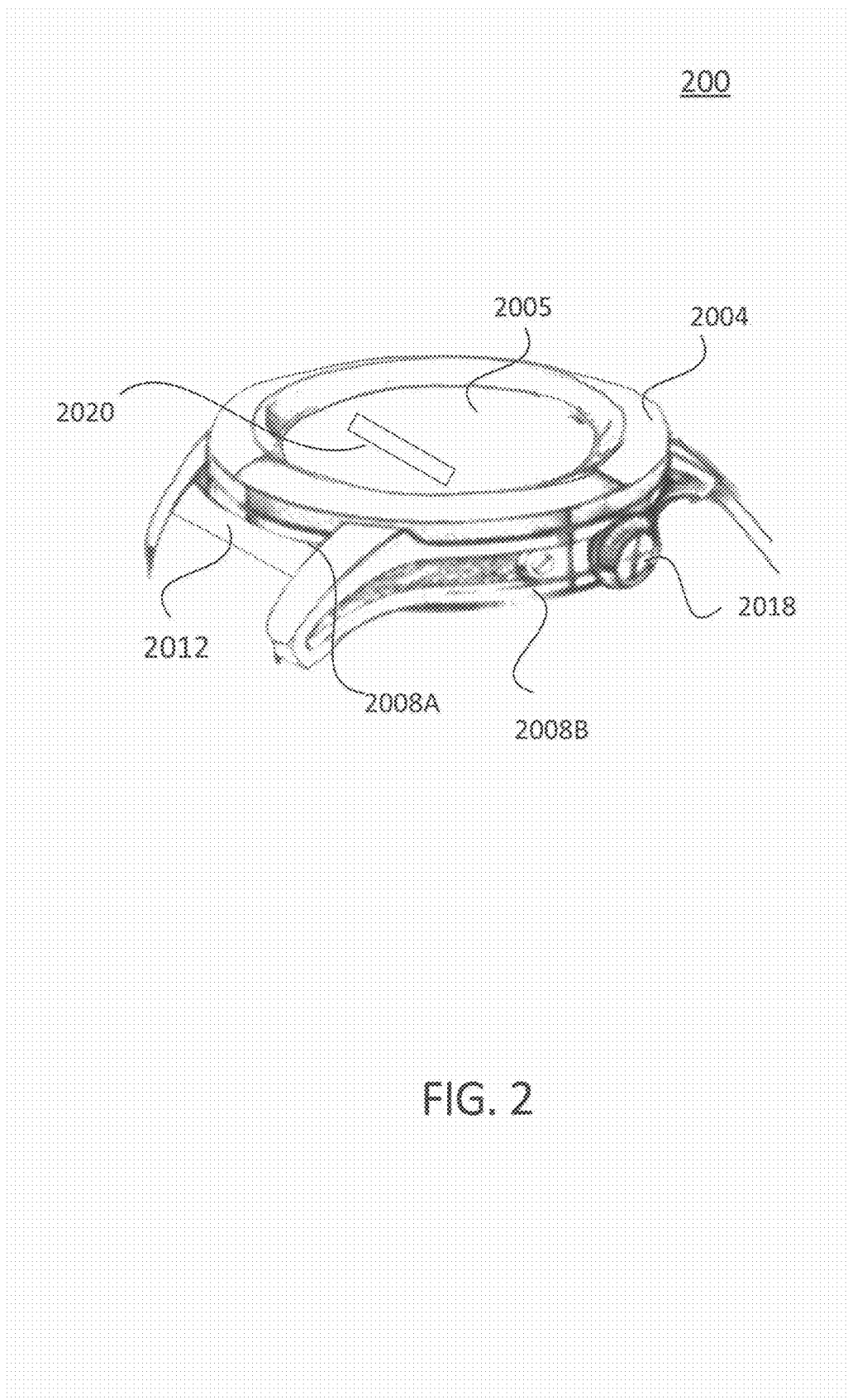

FIG. 2 is a perspective view of a time-displaying device according to a first example embodiment.

Referring to FIG. 2, one or more transmitting coils 2004 can be located along a periphery of a display surface 2005 of the time-displaying device 200 so as to be uniform with the design of the time-display device, as well as, not to cause any electrical or magnetic interference with the display surface 2005 or components within the time-displaying device 200. However, example embodiments are not limited thereto. For instance, the display surface 2005 can be located around a periphery of the one or more transmitting coils 2004.

The time-displaying device 200 transmits the electrical power to a wireless receiver by varying a frequency of an oscillating magnetic field of the one or more transmitting coils 2004 so as to induce an alternating current in a receiving coil (6004 shown in FIG. 6) of the wireless receiver.

The time-displaying device 200 can be configured to transmit no more than about 20-watts of the electrical power to the wireless receiver. However, example embodiments are not limited thereto.

Electrical components (e.g., the battery, electrical wiring, etc.) can be held within an encasing 2008 of the time-displaying device 200. The encasing 2008 can be formed by three-dimensional (3D) printing. The encasing 2008 can be formed of a top cover 2008A and a bottom cover 2008B.

The time-display device 200 can be secured around a user's arm or wrist using accessories (e.g., bands, straps, chain, etc.) at a distance that allows for inductive electrical power transfer between the time-displaying device 200 and the wireless receiver to occur. According to example embodiments, the time-display device 200 can be secured around the user's arm or wrist using accessories such that there is a substantially small distance between the time-displaying device 200 and the wireless receiver.

According to example embodiments, the time-displaying device 200 measures the progress of time while supplying the electrical power to the one or more transmitting coils 2004.

The time-displaying device 200 can include a transmitter chip 2012 configured to detect the wireless receiver of the time-displaying power source system. Once the wireless receiver is detected, the transmitter chip 2012 is configured to communicate with the wireless receiver and to control wireless electrical power transfer to the wireless receiver. A more in-depth discussion of the transmitter chip 2012 is provided below. The transmitter chip 2012 is electrically connected to the one or more transmitting coils 2004.

The time-displaying device 200 can include a first control button 2018 configured to temporarily (or reversibly) prevent a transmissive portion (including the one or more transmitting coils 2004) of an inductive electrical system in the time-displaying device 200 from transferring the electrical power by inductive electrical power transfer to the wireless receiver by turning the transmissive portion off, or placing the transmissive portion into an idle (or non-transmitting) state.

The time-displaying device 200 can include a second control button 2020 configured to turn off or on the display surface 2005 of the time-displaying device 200 if the time-displaying device 200 digitally displays/measures time, or to stop or start the measurement of time if the time-displaying device 200 is an analog timepiece.

In another example embodiment, the transmissive portion of the inductive electrical system can be prevented from transferring the electrical power by inductive electrical power transfer using electronics (for example, sensors) and/or a system (800 shown in FIG. 8) within the time-displaying device.

Figure 3:
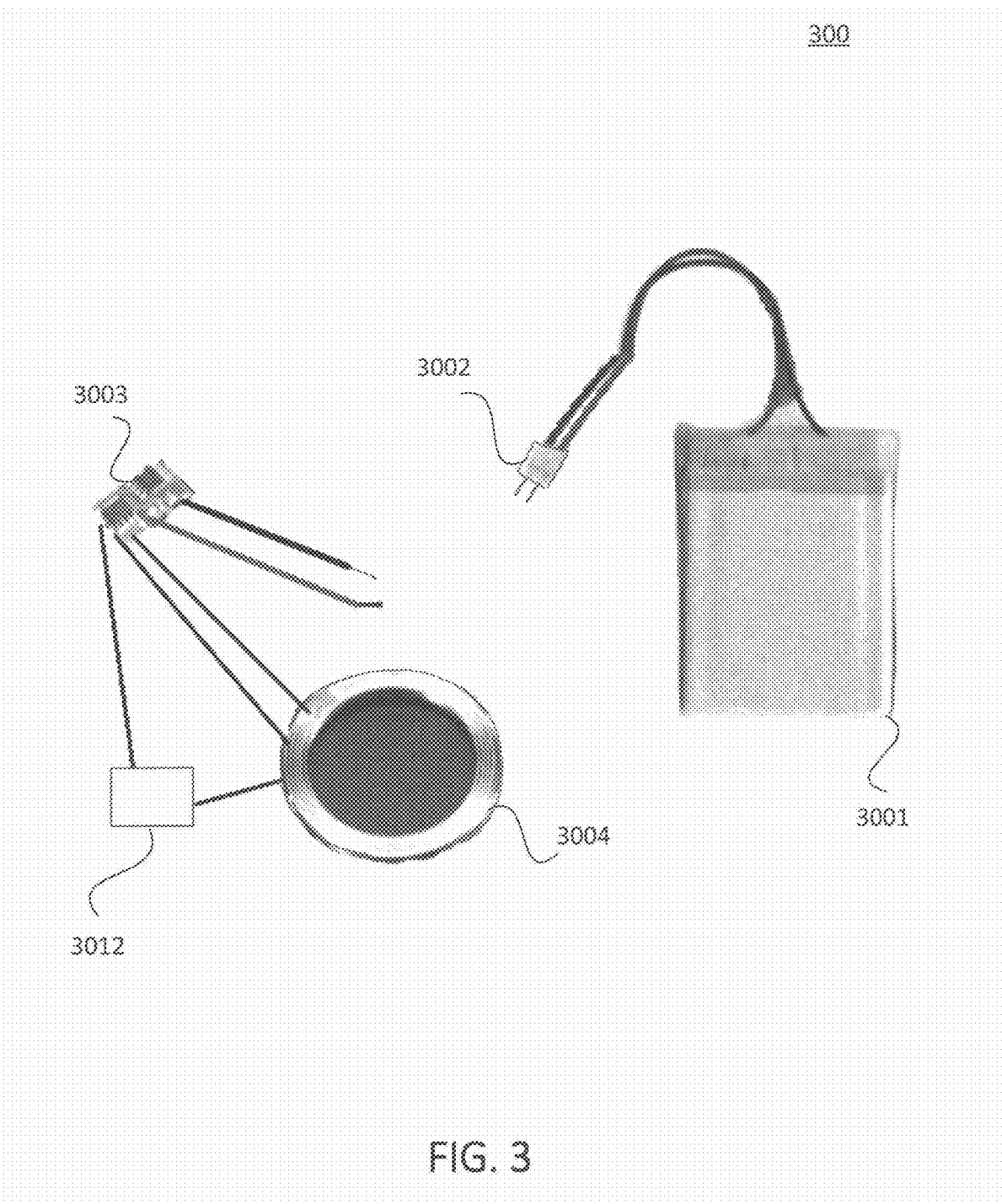

FIG. 3 is a perspective view of a transmissive portion of an inductive electrical system in a time-displaying device according to example embodiments.

Referring to FIG. 3, a transmissive portion 300 of an inductive electrical system in a time-displaying device according to example embodiments includes a first battery 3001 connected via an electrical connector 3002 to a converter 3003. The first battery 3001 can be a primary (also known as "disposable") battery or a secondary (also known as "rechargeable") battery. The first battery 3001 can have, for example, nickel-cadmium, nickel-zinc, nickel metal hydride, or lithium-ion cells.

The first battery 3001 supplies electrical power to the converter 3003 at a first voltage, $V_1$. The converter 3003 is also electrically connected to one or more transmitting coils 3004. The converter 3003 is configured to convert the electrical power received from the first battery 3001 at the first voltage, $V_1$, to a second voltage, $V_2$, and to supply the electrical power at the second voltage, $V_2$, to the one or more transmitting coils 3004. The second voltage, $V_2$, is higher than the first voltage, $V_1$.

According to some example embodiments, the time-displaying device can include a second battery (not shown) supplying electrical power to components configured to measure the progress of time. However, example embodiments are not limited to the use of a first and second battery. For instance, the first battery 3001 can supply the electrical power to the converter 3003, as well as, to the components configured to measure the progress of time.

The transmissive portion 300 of an inductive electrical system in a time-displaying device according to example embodiments includes a transmitter chip 3012 configured to detect a wireless receiver of the time-displaying power source system. Once the wireless receiver is detected, the transmitter chip 3012 is configured to communicate with the wireless receiver and to control wireless electrical power transfer to the wireless receiver by modulation of a switching frequency of an inverter (not shown) on the transmitter chip 3012. The transmitter chip 3012 is also configured to demodulate and decode communication packets received from the wireless receiver to adjust the transfer of the electrical power. The transmitter chip 3012 is electrically connected to the converter 3003 and the one or more transmitting coils 3004.

Figure 4A:
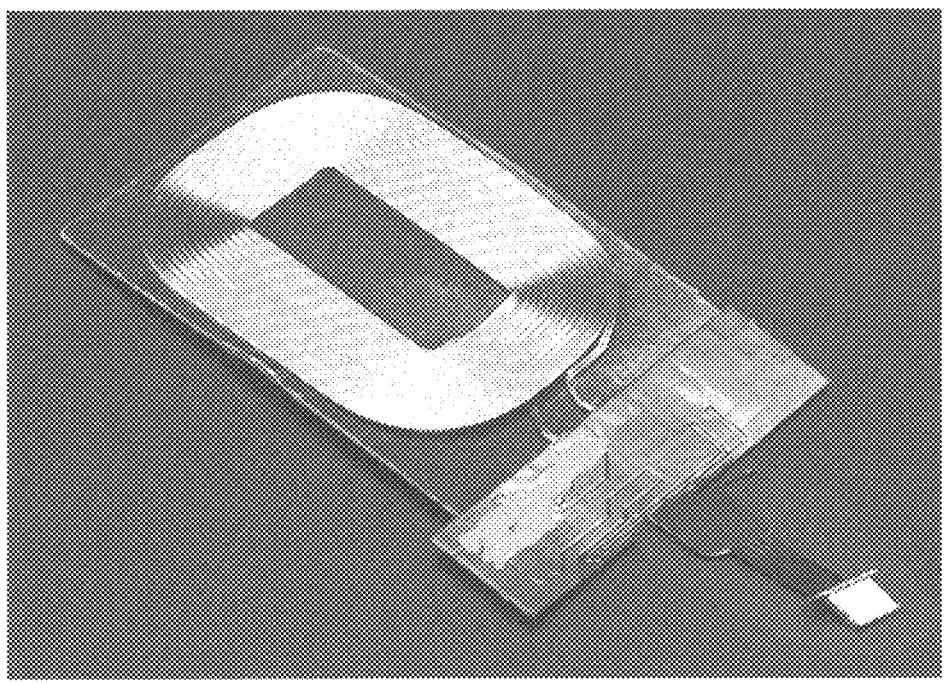
FIGS. 4A and 4B are plan views of transmitting/receiver coil(s) according to example embodiments.
Figure 4B:
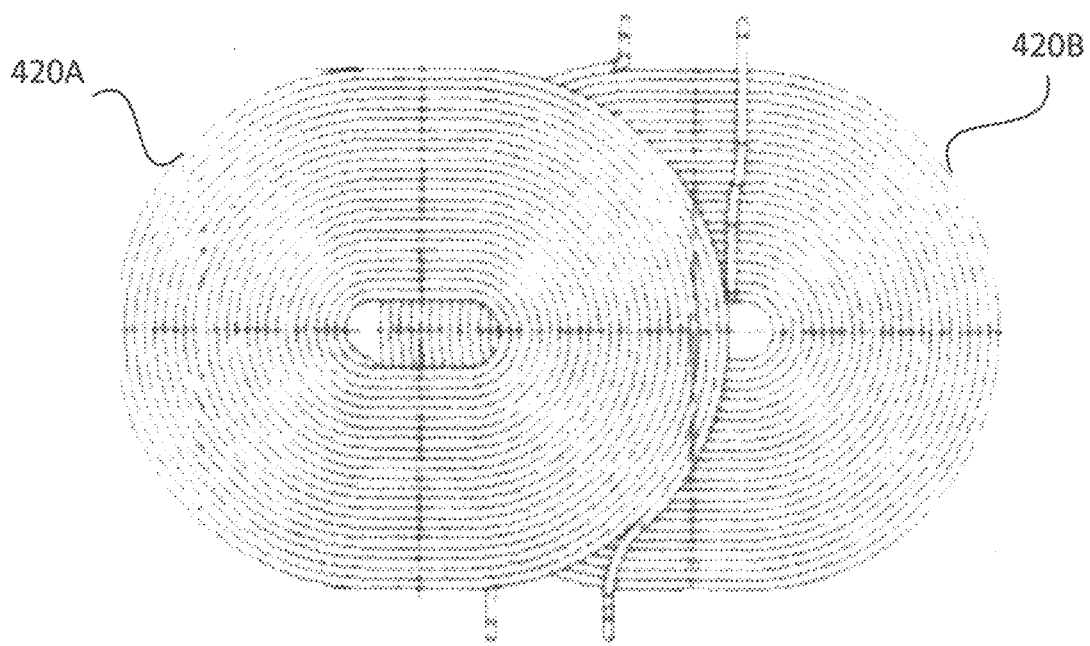

FIGS. 4A and 4B are plan views of transmitting/receiving coil(s) according to example embodiments.

Referring to FIG. 4A, a transmitting/receiving coil 410 can be of the wire-wounding type and have a thickness of about 1.75-mm. The transmitting/receiving coil 410 can be formed of a wire having about 100-105 strands. The transmitting/receiving coil 410 can be a single layer. Alternatively, the transmitting/receiving coil 410 can be of the wire-wounding type and consists of a wire having about 100-1500 strands. The transmitting/receiving coil 410 can have a rectangular shape. However, example embodiments are not limited thereto. For example, the transmitting/receiving coil 410 can have a circular, oval, square, or hexagonal shape.

The transmitting/receiving coil 410 can be formed of a magnetic material. The magnetic material can include copper or copper alloys.

A shielding, extending to at least of the outer dimensions of the transmitting/receiving coil 410, can be below the transmitting/receiving coil 410 to protect other components of the time-displaying power source system from the electromagnetic rays generated by the transmitting/receiving coils. The shielding can be formed of any soft magnetic material known in the art.

Referring to FIG. 4B, one or more first transmitting/receiving coils 420A along a first plane can overlap with one or more second transmitting/receiving coil 420B along a second plane. One third transmitting/receiving coil (not shown) can overlap with a respective one of the first and second transmitting/receiving coils 420A/420B. Another third transmitting/receiving coil (not shown) can overlap with the respective one of the first transmitting/receiving coil 420A, but not with the respective one of the second transmitting/receiving coils 420B. There may be several (e.g., 4-8) stacks of the transmitting/receiving coils with one or more transmitting/receiving coils in each layer of the stack.

Although the time-displaying device according to the first example embodiment can be secured around a user's arm or wrist using accessories, example embodiments are not limited thereto. For instance, a time-displaying device according to a second example embodiment can be a pocket watch, as will now be described.

Figure 5:
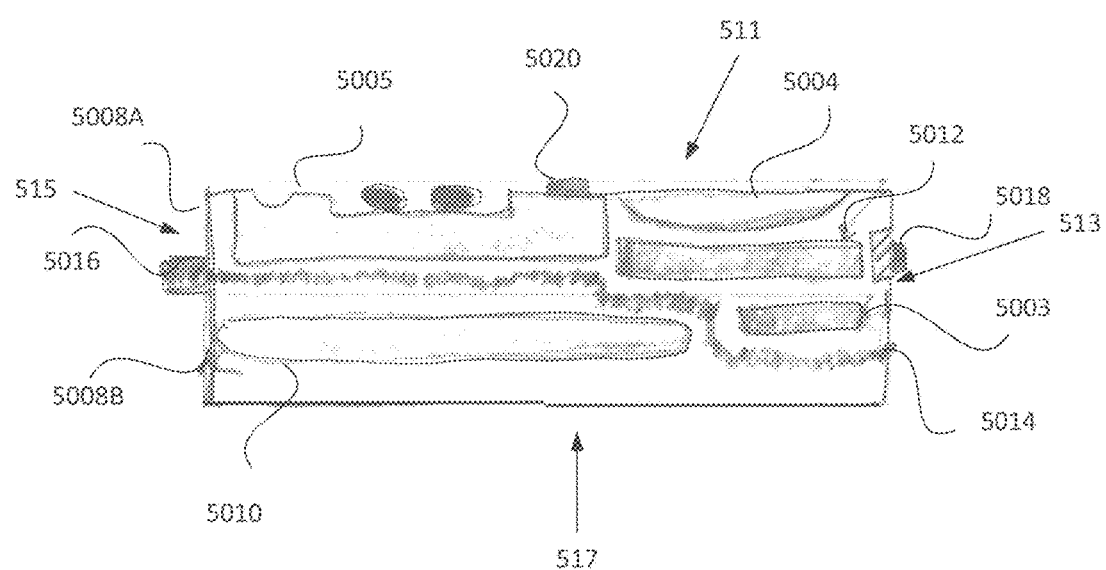

FIG. 5 is a cross-sectional view of a time-displaying device according a second example embodiment.

Referring to FIG. 5, a time-displaying device 500 according to a second example embodiment includes one or more transmitting coils 5004 co-planar with a front surface 511 of the time-displaying device 500. The one or more transmitting coils 5004 can be spaced apart from a time-display surface 5005 so as to be uniform with the design of the time-display device, as well as, not to cause any electrical or magnetic interference with the time-display surface 5005 or components within the time-displaying device 500. However, example embodiments are not limited thereto. For instance, the one or more transmitting coils 5004 can be co-planar with a top surface 513, a bottom surface 515 or a back surface 517 of the time-displaying device 500.

The time-displaying device 500 transmits the electrical power to a wireless receiver by varying a frequency of an oscillating magnetic field of the one or more transmitting coils 5004 so as to induce an alternating current in a receiving coil (6004 shown in FIG. 6) of the wireless receiver.

The time-displaying device 500 can be configured to transmit no more than about 20-watts of the electrical power to the wireless receiver. However, example embodiments are not limited thereto.

The time-displaying device 500 can include a first control button 5018 configured to temporarily (or reversibly) prevent a transmissive portion (including the one or more transmitting coils 5004) of an inductive electrical system in the time-displaying device 500 from transferring the electrical power by inductive electrical power transfer to the wireless receiver by turning the transmissive portion off, or placing the transmissive portion into an idle (or non-transmitting) state.

The time-displaying device 200 can include a second control button 5020 configured to turn off or on the time-display surface 5005 of the time-displaying device 500 if the time-displaying device 500 digitally displays/measures time, or to stop or start the measurement of time if the time-displaying device 500 is an analog timepiece.

Certain components (e.g., a first battery 5010, wiring, etc.) can be held within an encasing 5008 of the time-displaying device 500. The encasing 5008 can be formed by three-dimensional (3D) printing. The encasing 5008 can be formed of a front cover 5008A and a back cover 5008B.

A divider 5014 can be on a backside of the front cover 5008A. The divider 5014 separates the first battery 5010 within the back cover 5008B from the converter 5003, the one or more transmitting coils 5004, the time-display surface 5005 and the transmitter chip 5012 within the front cover 5008A.

The time-display device 500 can be secured around a user's arm or wrist using accessories (e.g., bands, straps, chain, etc.) at a distance that allows for inductive electrical power transfer between the time-displaying device 500 and the wireless receiver to occur. According to example embodiments, the time-display device 500 can be secured around the user's arm or wrist using accessories such that there is a substantially small distance between the time-displaying device 500 and the wireless receiver.

A transmissive portion of an inductive electrical system in the time-displaying device 500 according to example embodiments includes the first battery 5010 connected via an electrical connector (see electrical connector 3002 shown in FIG. 3) to a converter 5003. The first battery 5010 can be a primary (also known as "disposable") battery or a secondary (also known as "rechargeable") battery. The first battery 5010 can have, for example, nickel-cadmium, nickel-zinc, nickel metal hydride, or lithium-ion cells.

The first battery 5010 supplies electrical power to the converter 5003 at a first voltage, $V_1$. The converter 5003 is also electrically connected to one or more transmitting coils 5004. The converter 5003 is configured to convert the electrical power received from the first battery 5010 at the first voltage, $V_1$, to a second voltage, $V_2$, and to supply the electrical power at the second voltage, $V_2$, to the one or more transmitting coils 5004. The second voltage, $V_2$, is higher than the first voltage, $V_1$.

According to some example embodiments, the time-displaying device 500 can include a second battery (not shown) supplying electrical power to components configured to measure the progress of time. However, example embodiments are not limited to the use of a first and second battery. For instance, the first battery 5010 can supply the electrical power to the converter 5003, as well as, to the components configured to measure the progress of time.

A transmissive portion of an inductive electrical system in a time-displaying device according to example embodiments includes the transmitter chip 5012 configured to detect a wireless receiver of the time-displaying power source system. Once the wireless receiver is detected, the transmitter chip 5012 is configured to communicate with the wireless receiver and to control wireless electrical power transfer to the wireless receiver by modulating the switching frequency of an inverter (not shown) on the transmitter chip 5012. The transmitter chip 5012 is also configured to demodulate and decode communication packets received from the wireless receiver to adjust the transfer of the electrical power. The transmitter chip 5012 is electrically connected to the converter 5003 and the one or more transmitting coils 5004.

Figure 6:
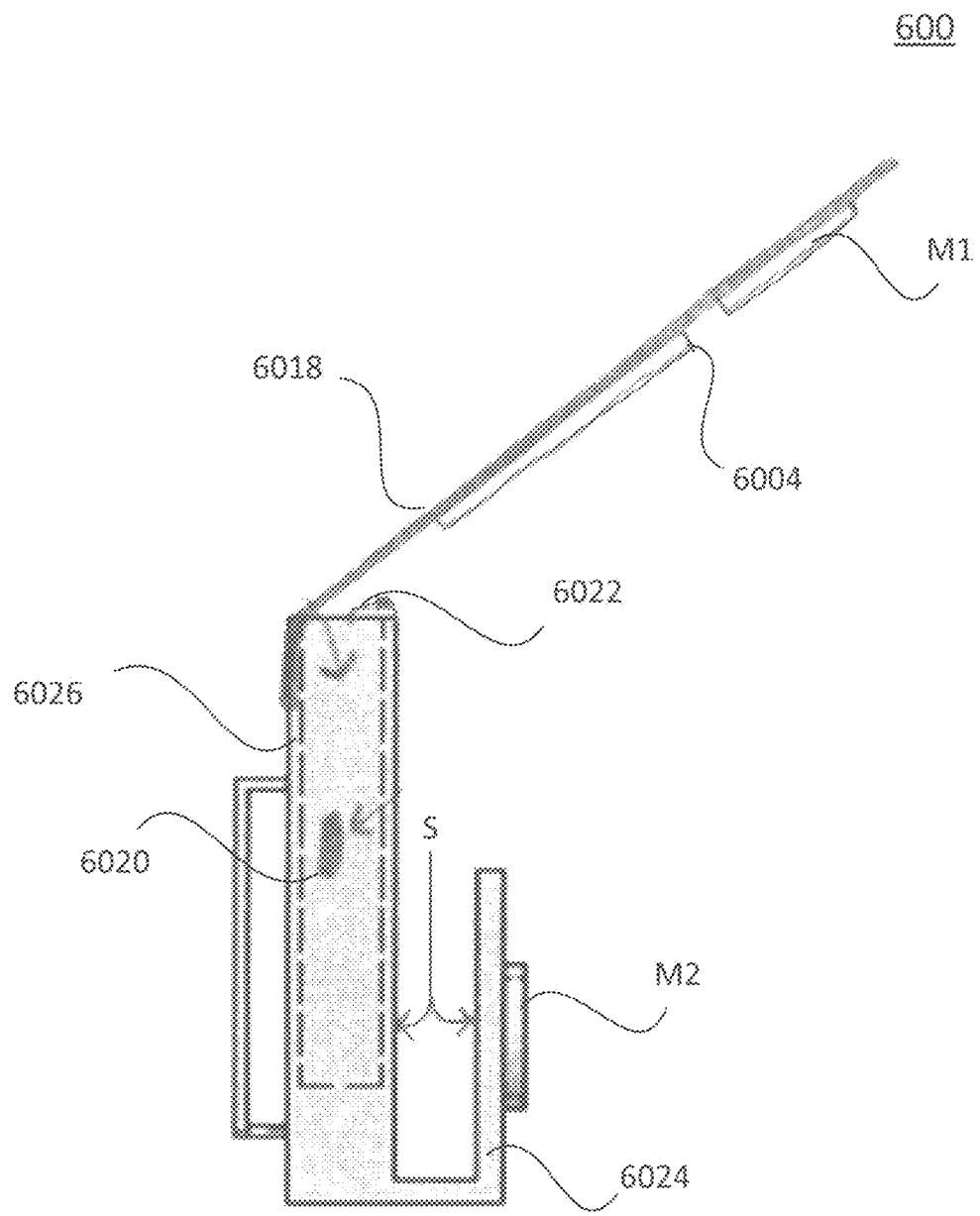

FIG. 6 is side view of a wireless receiver according to example embodiments.

Referring to FIG. 6, a wireless receiver 600 according to example embodiments includes one or more receiving coils 6004 configured to receive and store electrical power transmitted by inductive electrical power transfer. The one or more receiving coils 6004 are configured to receive the electrical power over a substantially small distance from a time-displaying device that is configured to transmit the electrical power. The one or more receiving coils 6004 can be embedded within or attached to a cover flap 6018 of the wireless receiver 600. The one or more receiving coils 6004 can be at a depth of no more that about 2.5-mm from an outer surface of the cover flap 6018.

The wireless receiver 600 includes a charging port 6020 electrically connected to the one or more receiving coils 6004. Electrical power stored in the one or more receiving coils 6004 is transmitted to a wireless device through the charging port 6020. The charging port 6020 and other electrical components can be stored in a housing complex 6026.

The charging port 6020 can be a capacitor or supercapacitor known in the art to store an electrical charge. The type of capacitor or supercapacitor can be selected based on the amount of electrical power needed to charge the wireless device. The charging port 6020 can store electrical power when the one or more receiving coils 6004 are not connected or inductively coupled to the time-displaying device and/or when the wireless device is not charging.

The wireless receiver 600 can have a slot S in which the wireless device is held. The wireless device can be secured within the slot S by folding the cover flap 6018 over the slot S, and coupling a first magnet M1 on the cover flap 6018 with a second magnet M2 on a body 6024 of the wireless receiver 600.

The wireless receiver 600 can include a control button 6022 configured to temporarily (or reversibly) prevented the charging port 6020 from receiving the electrical power by inductive electrical power transfer from the time-displaying device by turning the charging port 6020 off, or placing the charging port 6020 into an idle (or non-recharging) state.

Now, a method of charging a wireless device by using a time-displaying power source system will be explained.

Figure 7:
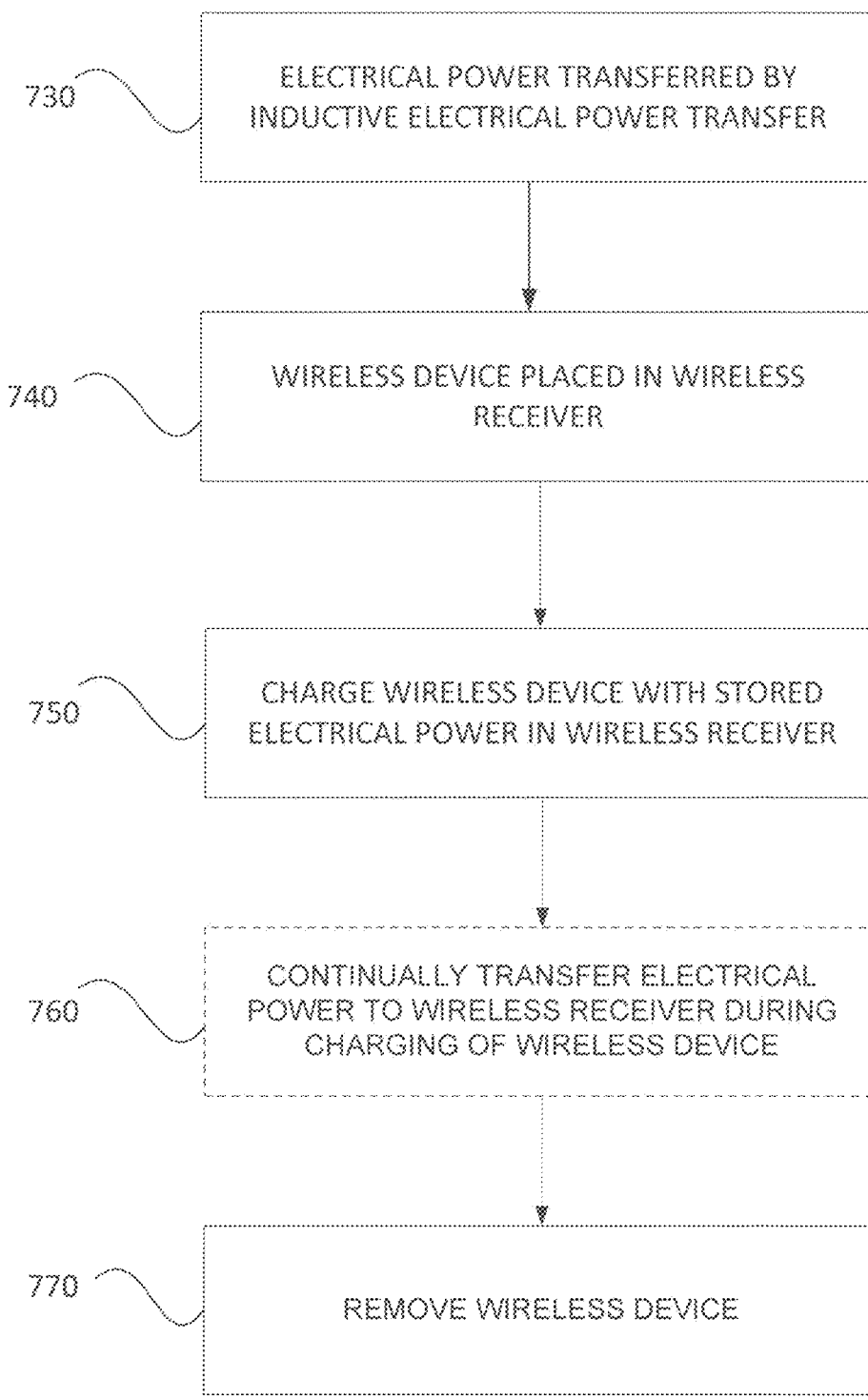

FIG. 7 is a flow chart of charging a wireless device using a time-displaying power source system according to example embodiments.

Referring to FIG. 7, electrical power is transmitted by inductive electrical power transfer over a substantially small distance from a time-displaying device to a wireless receiver, which stores the electrical power (730). The time-displaying device can be configured to transmit up to about 20-watts of the electrical power. The electrical power is transferred by coupling one or more transmitting coils of the time-displaying device to a receiving coil of the wireless receiver by varying a frequency of an oscillating magnetic field of the one or more transmitting coil so as to induce an alternating current in the receiving coil. The one or more transmitting coils can automatically couple to the receiving coil when the one or more transmitting coil is about 5-mm from the receiving coil.

The electrical power is supplied from a battery of the time-displaying device to a converter of the time-displaying device. The electrical power can be supplied to the converter at a first voltage. The converter converts the electrical power received from the battery at the first voltage to a second voltage, and transfers the electrical power at the second voltage to the one or more transmitting coil. The second voltage is generally higher than the first voltage. However, example embodiments are not limited thereto. For instance, assuming that the electrical power provided by the battery is higher than desired for the wireless device, then the second voltage can be set lower than the first voltage.

A wireless device is placed within a slot of the wireless receiver (740). However, example embodiments are not limited thereto. For instance, the wireless device can be placed within the slot before the time-displaying displaying device transfers the electrical power to the wireless receiver. Placement of the wireless device within the slot electrically connects the wireless device to a charging port of the wireless receiver.

The time-displaying device can include a first control button configured to temporarily (or reversibly) prevent a transmissive portion (including the one or more transmitting coils) of an inductive electrical system in the time-displaying device from transferring the electrical power by inductive electrical power transfer to the wireless receiver by turning the transmissive portion off, or placing the transmissive portion into an idle (or non-transmitting) state.

The time-displaying device can include a second control button configured to turn off or on the display surface of the time-displaying device if the time-displaying device digitally displays/measures time, or to stop or start the measurement of time if the time-displaying device is an analog timepiece.

The wireless device is charged by transferring the stored electrical power through the charging port of the wireless receiver to the wireless device (750). The time-display device can continually transfer electrical power to the wireless receiver while the wireless device is being charged.

The wireless device can be removed once a desired charge is reached (760).

Upon removal the wireless device or completion of the charge or depletion of the stored electrical power, the time-displaying device can be re-charged, and then the time-displaying device can re-charge the wireless receiver by transferring additional electrical power to the wireless receiver (770).

Upon completion of the re-charging of the wireless receiver, the charging port of the wireless receiver can be temporarily (or reversibly) prevented from receiving the electrical power by inductive electrical power transfer from the time-displaying device by turning the charging port off, or placing the charging port into an idle (or non-recharging) state.

According to example embodiments, the time-displaying device is a wristwatch, a pocket watch, a clock or a timepiece. Thus, the time-displaying device is a fashionable way of concealing a power source.

According to example embodiments, the wireless receiver is a case within which the wireless device is held. Therefore, the time-displaying power source system is a mobile power source that allows a user to charge a wireless device without being restricted to a particular area.

Figure 8:
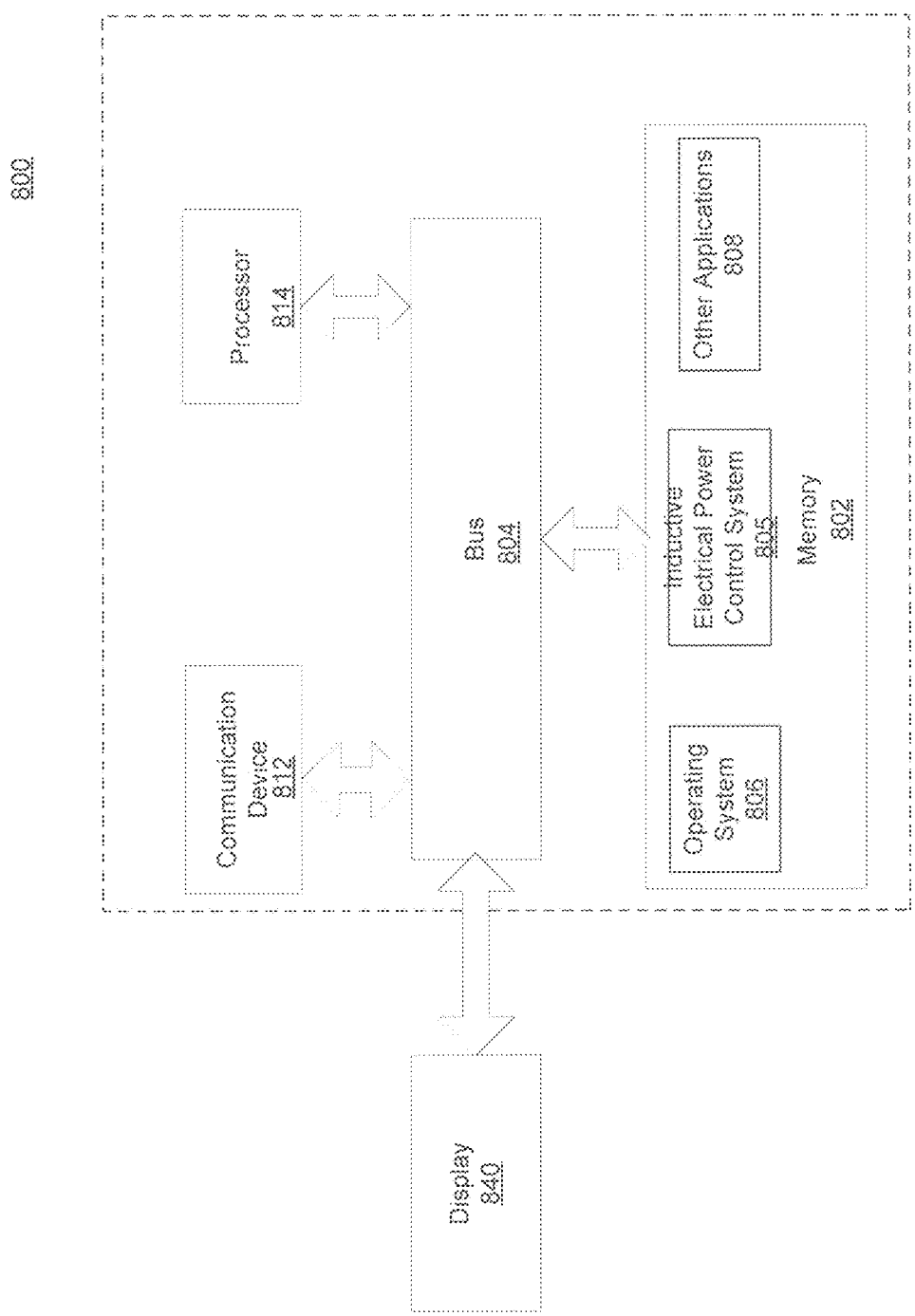

FIG. 8 is a block diagram of a system in a time-displaying device and/or a wireless receiver according to an example embodiment. Some or all of the components of FIG. 8 can also be used to implement any of the elements of FIGS. 1-6.

Referring to FIG. 8, a system 800 in a time-displaying device and/or a wireless receiver according to an example embodiment provides functionality for the device(s).

Although shown as a single system, the functionality of system 800 can be implemented as a distributed system. System 800 includes a bus 804 or other communication mechanism for communicating information, and a processor 814 coupled to bus 804 for processing information. Processor 814 can be any type of general or specific purpose processor. System 800 further includes a memory 802 for storing information and instructions to be executed by processor 814. Memory 802 can be comprised of any combination of random access memory ("RAM"), read only memory ("ROM"), static storage such as a magnetic or optical disk, or any other type of computer-readable medium.

A computer-readable medium can be any available medium that can be accessed by processor 814, and can include both a volatile and nonvolatile medium, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

According to an example embodiment, memory 802 stores software modules that provide functionality when executed by processor 814. The software modules include an operating system 806 that provides operating system functionality for system 800, as well as the rest of the time-displaying device and/or the wireless receiver. The software modules also include an inductive electrical power control system 805 that controls the transfer of electrical power by inductive electrical power transfer from the time-displaying device to the wireless receiver (as described above) and provides functionality. The software modules further include other applications 808, such as, a time controls.

System 800 can further include a communication device 812 (e.g., a network interface card) that provides wireless network communication for infrared, radio, Wi-Fi, or cellular network communications. Alternatively, communication device 812 can provide a wired network connection (e.g., a cable/Ethernet/fiber-optic connection, or a modem).

Processor 814 is further coupled via bus 804 to a time display 840 (e.g., a light-emitting display ("LED") or a liquid crystal display ("LCD")) for displaying a graphical representation or a user interface to an end-user. Time display 840 can be a touch-sensitive input device (i.e., a touch screen) configured to send and receive signals from processor 814, and can be a multi-touch touch screen.

The foregoing is illustrative of example embodiments and is not to be construed as limiting thereof. Those skilled in the art will readily appreciate that many modifications are possible in example embodiments without materially departing from the novel teachings. All such modifications are intended to be included within the scope of the disclosure as defined in the claims.

What is claimed:

1. A method of charging a wireless device, the method comprising:

converting electrical power at a first voltage to a second voltage using a converter, the electrical power at the first voltage being received from a battery electrically connected to the converter;

supplying the electrical power at the second voltage to at least one transmitting coil of a time-displaying device, the at least one transmitting coil being electrically connected to the converter;

transmitting the electrical power at the second voltage by inductive electrical power transfer from the time-displaying device to a wireless receiver which stores the electrical power, the transmitting of the electrical power including coupling the at least one transmitting coil of the time-displaying device to a receiving coil of the wireless receiver by varying a frequency of an oscillating magnetic field of the at least one transmitting coil so as to induce an alternating current in the receiving coil; and
transferring the stored electrical power through a charging port of the wireless receiver to the wireless device, wherein the time-displaying device is configured to be worn by a user.

2. The method of claim 1, wherein the transmitting of the electrical power includes transmitting up to about 20-watts of the electrical power.

3. The method of claim 1, wherein
the second voltage is higher than the first voltage.

4. The method of claim 1, wherein the transferring of the stored electrical power includes connecting the wireless device to a charging port of the wireless receiver.

5. The method of claim 1, wherein time-displaying device is a wristwatch, a pocket watch, or a timepiece.

6. The method of claim 1, wherein the wireless receiver is a case within which the wireless device is held.

7. The method of claim 1, further comprising:
temporarily preventing the time-displaying device from transferring the electrical power by inductive electrical power transfer to the wireless receiver.

8. The method of claim 1, further comprising:
temporarily preventing the wireless receiver from receiving the electrical power by inductive electrical power transfer from the time-displaying device.

9. A wearable time-displaying device configured to transmit electrical power to a wireless receiver by inductive electrical power transfer, comprising:
at least one transmitting coil along a display surface of the time-displaying device, the time-displaying device transmitting the electrical power to the wireless receiver by varying a frequency of an oscillating magnetic field of the at least one transmitting coil so as to induce an alternating current in a receiving coil of the wireless receiver; and
a converter electrically connected to a battery supplying the electrical power to the converter at a first voltage, the converter being electrically connected to the at least one transmitting coil, and the converter being configured to convert the electrical power received from the battery at the first voltage to a second voltage and to supply the electrical power at the second voltage to the at least one transmitting coil.

10. The wearable time-displaying device of claim 9, wherein the wireless receiver includes a charging port via through which the stored electrical power is transferred to a wireless device.

11. The wearable time-displaying device of claim 9, wherein the time-displaying device is configured to transmit no more than about 20-watts of the electrical power to the wireless receiver.

12. The wearable time-displaying device of claim 9, wherein the at least one transmitting coil is along a periphery of the display surface of the time-displaying device.

13. The wearable time-displaying device of claim 9, wherein
the second voltage is higher than the first voltage.

14. The wearable time-displaying device of claim 9, wherein a receiving coil is attached to a cover of the wireless receiver at a depth of no more that about 2.5-mm from an outer surface of the cover.

15. The wearable time-displaying device of claim 9, wherein time-displaying device is a wristwatch, a pocket watch, or a timepiece.

16. The wearable time-displaying device of claim 9, wherein the wireless receiver is a case within which a wireless device to be charged is held.

17. The wearable time-displaying device of claim 9, wherein the time-displaying device includes a transmitter chip configured to control the inductive electrical power transfer to the wireless receiver by modulation of a switching frequency of an inverter.

18. The wearable time-displaying device of claim 9, wherein the wireless receiver includes a control button configured to temporarily prevent the wireless receiver from receiving the electrical power by inductive electrical power transfer from the time-displaying device.

\* \* \* \* \*